United States Patent [19]

Brown

[11] 4,427,169
[45] Jan. 24, 1984

[54] VARIABLE CAMBER FLAP END SEAL

[75] Inventor: Stephen T. Brown, Bellevue, Wash.

[73] Assignee: Boeing Commercial Airplane Company, Seattle, Wash.

[21] Appl. No.: 386,251

[22] Filed: Jun. 8, 1982

[51] Int. Cl.³ .............................................. B64C 3/44
[52] U.S. Cl. ................................... 244/219; 244/215; 244/129.1; 244/130
[58] Field of Search ............... 244/211, 212, 213, 215, 244/216, 219, 129.1, 129.4, 130; 49/488, 489, 490; 277/192, 193, 199

[56] References Cited

U.S. PATENT DOCUMENTS

| | | | |
|---|---|---|---|
| 1,698,158 | 1/1929 | Glass | 220/222 |
| 1,854,444 | 4/1932 | Barnhart | 244/215 |
| 2,671,935 | 3/1954 | Flues | 20/69 |
| 2,722,978 | 11/1955 | Frisk | 160/40 |
| 2,728,982 | 1/1956 | Merrill | 29/533 |
| 2,792,599 | 5/1957 | Gantschnigg et al. | 20/65 |
| 3,048,356 | 8/1962 | Curtis et al. | 244/129 |
| 3,175,791 | 3/1965 | Toms | 244/130 |
| 3,447,811 | 6/1969 | Mayfield | 277/193 |
| 3,589,070 | 6/1971 | Hansen | 49/483 |
| 3,706,173 | 12/1972 | Taylor | 52/716 |
| 4,312,486 | 1/1982 | McKinney | 244/219 |

Primary Examiner—Trygve M. Blix
Assistant Examiner—Rodney Corl
Attorney, Agent, or Firm—Eugene O. Heberer

[57] ABSTRACT

An end seal (36) for a variable camber flap in which the seal is formed of an upper portion (52) including closely spaced fingers (56). The fingers extend generally vertically downwardly from adjacent a flexible surface (40) of a flap (20). There are lower sealing walls (94, 96) extending generally vertically upwardly from adjacent the bottom of the flap (106). The lower sealing walls are adapted to remain in sealing engagement with the fingers as the camber of the flap is varied by increasing the curvature as it is lowered from a normally upper position.

16 Claims, 7 Drawing Figures

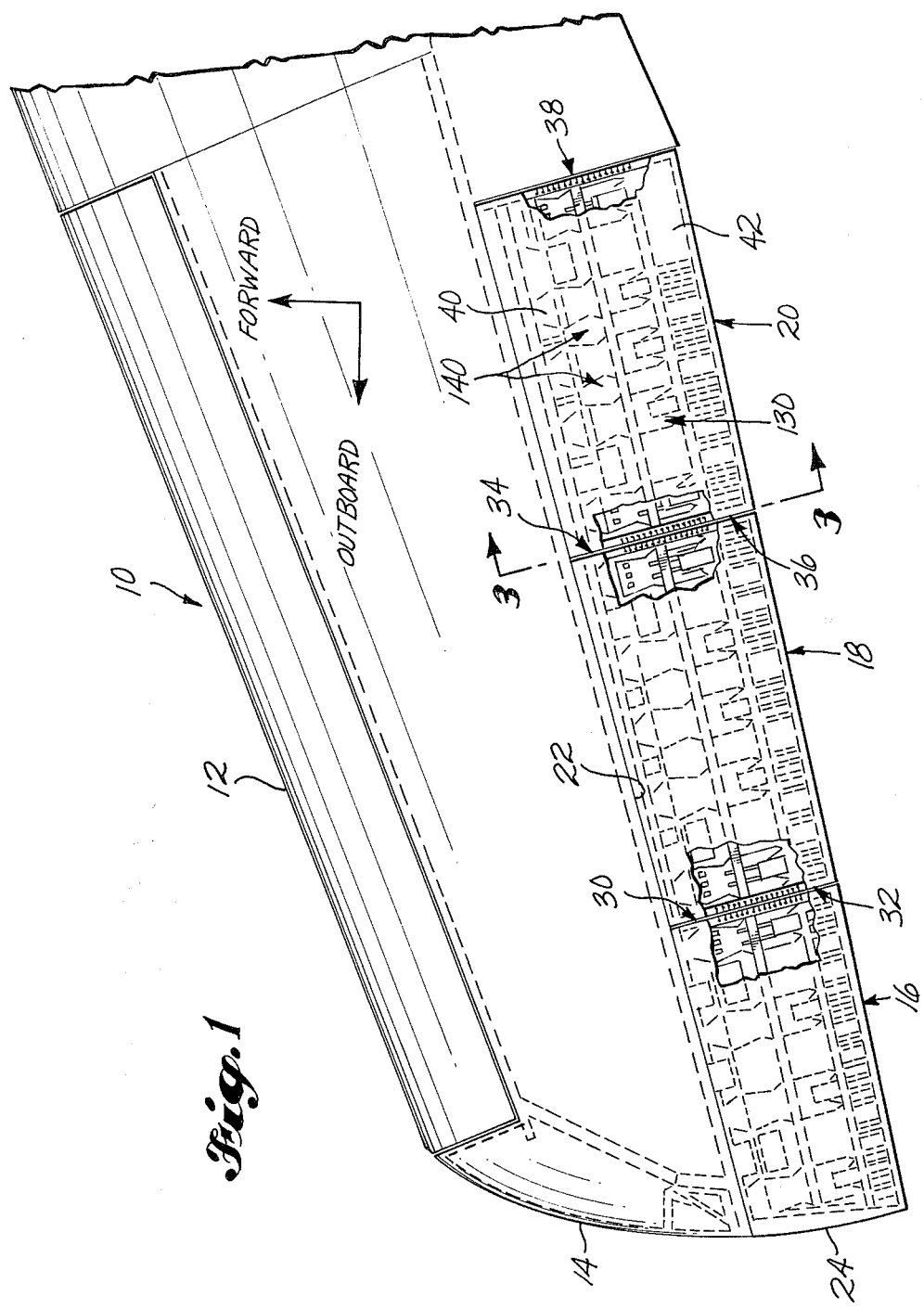

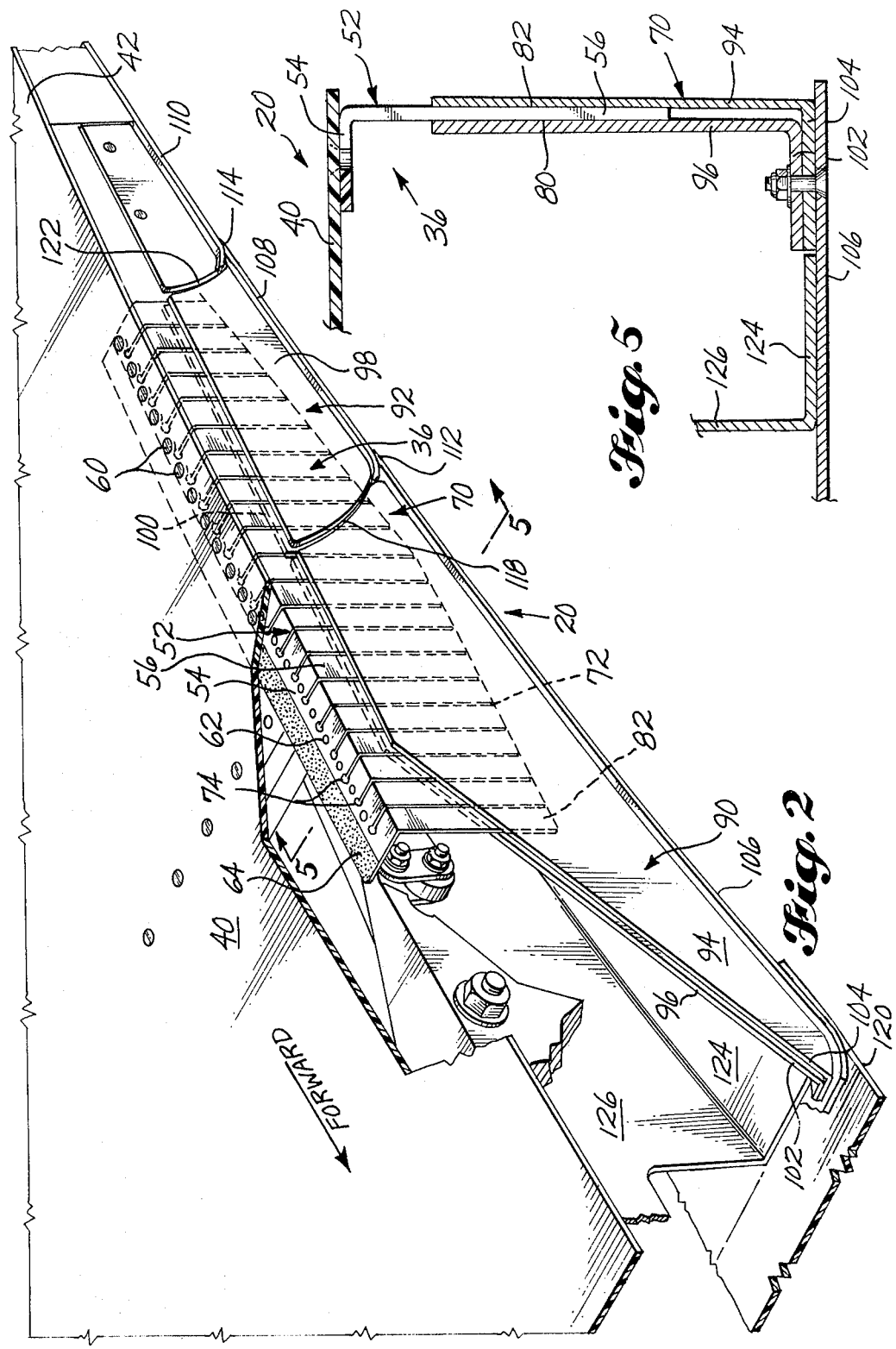

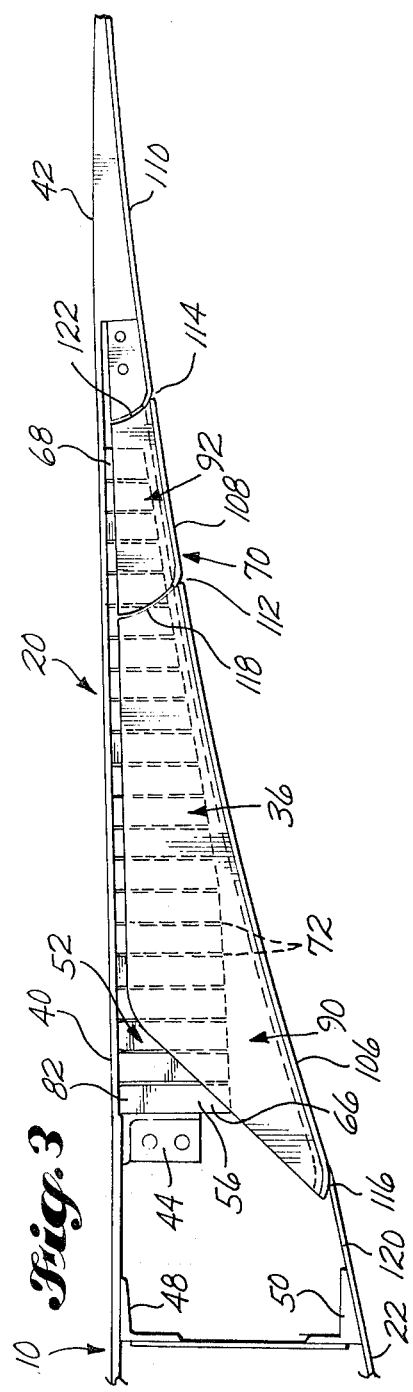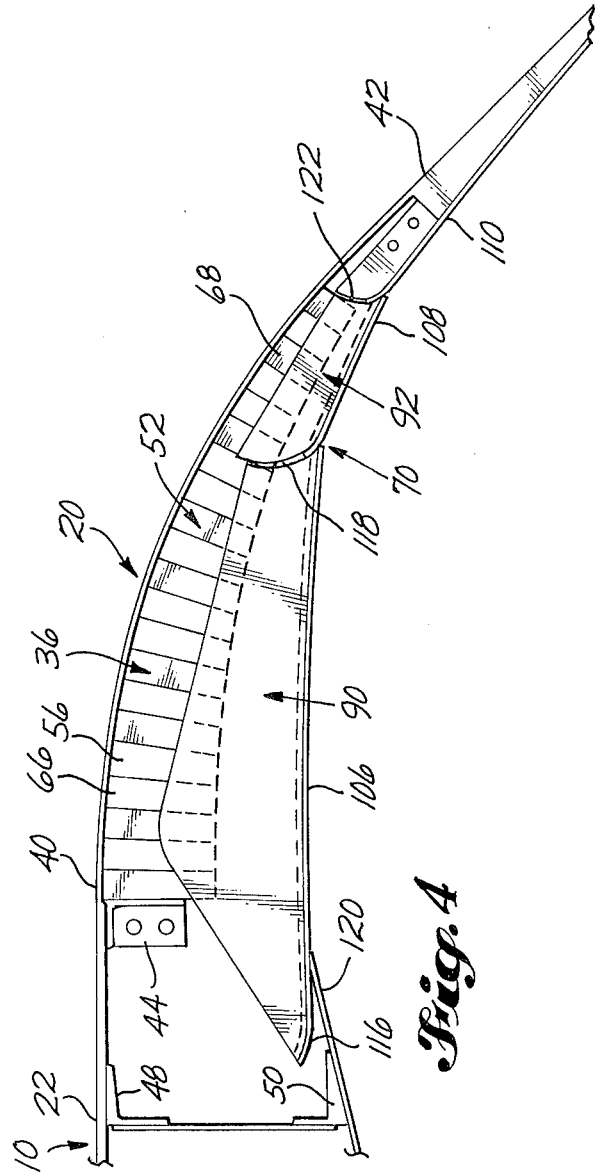

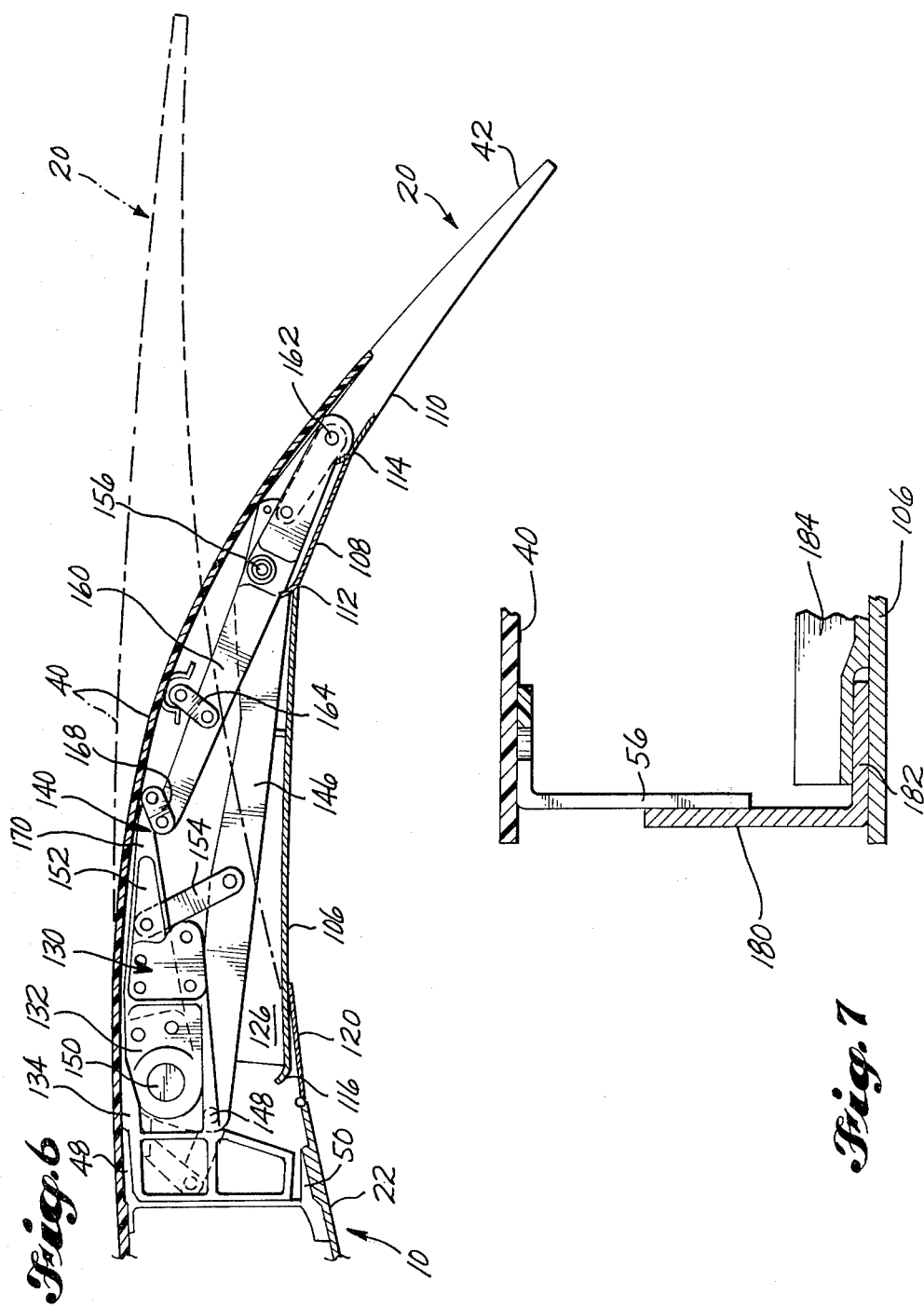

VARIABLE CAMBER FLAP END SEAL

The Government has rights in this invention pursuant to contract No. F33615-78-C-3027 awarded by the U.S. Air Force.

DESCRIPTION

1. Technical Field

This invention relates to variable camber flaps and end seals therefor, as may be used on aircraft wings or other aerodynamic structures.

2. Background Art

In the use of variable camber flaps on aircraft wings, in the upper or cruise position, the upper surface of the flap has a nominal fore and aft camber. When the flaps are lowered, the camber of the upper surface is substantially increased.

In the development of variable camber flaps, it was found that large boundary displacements occurred as the flaps were raised and lowered. It was also found that new types or methods of sealing the flap ends were required in order to protect the actuation mechanisms and equipment from water and other contaminants, and to make the surfaces aerodynamically efficient.

Thus, it was determined that flap end seals must restrict the entrance and entrapment of water. It was also found that spanwise airflow into the flaps must be restricted to the maximum practical extent.

Attempts had been made to make end seals out of sponge rubber, the seals being in the form of upper and lower parts, but this presented the problem of requiring a number of rotating plates and links tying them together. The sponge rubber is also subject to abrasion and weathering which would require frequent disassembly and reassembly.

A search of the patent literature discloses a number of seals which are not directly pertinent. The closest approach to the present invention found is in U.S. Pat. No. 2,792,599 in that it discloses a multiple finger concept but the finger elements are not adapted to cooperate with a channel or similar structure as in the present invention.

The following U.S. Pat. Nos. disclose various forms of seals: 2,671,935, 2,722,978, 2,728,982, 2,792,599, 3,048,356, 3,175,791, 3,589,070, 3,706,173.

DISCLOSURE OF THE INVENTION

The invention is an end seal for a variable camber flap and an end seal in combination with the flap in which an upper seal portion of closely spaced sealing members in the form of fingers extend generally vertically downwardly from adjacent the top of the flap. The top of the flap is flexible so that when the flap is lowered, the camber curvature of the top is substantially increased.

The leading end of the flap is adapted to be fixed to an aircraft wing, for example. The lower surfaces of the flap are articulated and the flap is lowered and raised by linkage means therein.

Lower sealing means generally in the form of upwardly extending channel walls are associated with the lower surfaces and are adapted to receive the closely spaced sealing members extending downwardly from the top in slidable and sealing engagement. The lower sealing means support the closely spaced sealing members in sealing engagement as the camber of the flap is varied to increase the curvature as it is lowered from a normal cruise position to a takeoff or landing position, for example.

The closely spaced sealing members or fingers have gaps therebetween formed by slots which extend from a lower end of the fingers to an upper plate portion at an angle to the fingers and the slots terminate in a stress relief hole in the plate portion. The slots taper upwardly from the lower end and have an angle of about two degrees when the flap is in a normal upper cruise position, and the slots are closed or substantially closed when the flap is lowered and the curvature of the camber is increased.

End seals according to the invention are positioned at least on one span end of each flap and are provided to prevent contamination of the flap mechanism and to improve aerodynamics of the flap. The spacing between the fingers is such to accommodate the flexing of the top surface, the slots being minimized in width to admit a minimum of airflow into the flap.

The seal has the advantage of being a simple single joint to make possible low manufacturing and assembly costs and unlikely failure under normal load conditions. It provides excellent sealing efficiency with a minimum maintenance due to very little abrasion. The sliding arrangement between the upper and lower sealing parts provides the advantages of producing an excellent seal, and yet, being flexible enough to survive substantial warpage of the upper and lower parts.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a plan view of an aircraft wing having three flaps, according to the invention, and end seals at five ends of the flaps;

FIG. 2 is a fragmentary partially cutaway and partially cross-sectional view illustrating the configuration of the upper and lower members forming the end seal;

FIG. 3 is an end view of a flap having an end seal according to the invention, the flap being in its fully-up position, taken along the line 3—3 in FIG. 1;

FIG. 4 is an end view of the flap as shown in FIG. 3 in the fully-down position, illustrating the camber variation, the increase in curvature, the flexibility of the flap, and the operation of the sealing mechanism;

FIG. 5 is a fragmentary end view illustrating the sliding sealing engagement of the upper and lower sealing members of the end seal, taken along the line 5—5 in FIG. 2;

FIG. 6 is a cross-sectional end view of a flap illustrating a linkage system which serves to raise and lower the flap; and FIG. 7 is a fragmentary end view illustrating another embodiment of a lower portion of the end seal.

BEST MODE FOR CARRYING OUT THE INVENTION

Referring again to the drawings, there is shown in FIG. 1 a plan view of an aircraft wing 10 having a leading edge 12 and outboard edge 14, and three variable camber flaps 16, 18 and 20 forming a substantial portion of the trailing end of the wing. The flaps 16, 18 and 20 are fixed to a trailing end 22 of the wing 10.

The outboard flap 16 has an outwardly tapering end 24, permanently closed and adapted to flex with the upper and lower sides of the flap as it is moved upwardly and downwardly, during which times the camber is varied. There are five seals 30, 32, 34, 36 and 38 on respective ends of the flaps 16, 18 and 20, according to the invention, FIG. 1. The seals are identical and the seal 36 is specifically shown in detail in FIGS. 2-5.

The flap 20 is shown in its fully up position in FIG. 3. Its upper surface is in nominal camber and it is formed of a flexible fiberglass plate portion 40 and a rigid slightly curved trailing edge beam portion 42. The flexible plate 40 may extend forwardly to directly trail the rearward end of the aircraft wing 10 or may trail from the vicinity of a support at 44. In any event, the flexible plate 40 is intermediate the ends of the flap 20. The forward end of the flap is fixably secured to the trailing end 22 of the wing by upper and lower spars 48 and 50.

As best seen in FIGS. 2 and 5, an upper, fiberglass, inverted L-shaped portion 52 of end seal 36 has a generally horizontally short leg 54 and an elongated generally vertical leg 56. The upper leg 54 is secured to the fiberglass top plate 40 by means of fasteners 60 through holes 62 and may in addition be bonded as at surface 64, FIG. 2. The length of the individual fingers, as 66, at the leading end, and 68, at the trailing end, FIG. 3, is dependent upon the requirements of the engagement of the upper portion 52 of the seal with an aluminum lower portion 70 of the seal. As shown in FIG. 3, in the fully-up position, the fingers are spaced at 72 by an upwardly extending taper, the spaces having an angle of no less than two degrees in the fully-up position. The spaces 72 terminate in leg 54 in stress relief holes 74, to relieve any stress that may develop in the fingers. The holes and slots 72 are about one inch apart. Inboard and outboard surfaces 80 and 82 of the fingers are coated with Teflon lubricant for easy sealing engagement with the lower portion 70 of the seal.

The fingers 56 of the upper sealing portion are slidably sealingly engaged and supported in lower portion 70 of the seal, formed of channels 90 and 92. The channels have upwardly extending legs 94, 96 and 98, 100, respectively. The legs 96, 94 are formed as upper portions of L-shaped members having horizontal short legs 102 and 104, secured to a lower bottom forming, skin plate 106 of the flap 20. The legs of the channel 92 are similarly secured and supported on a second plate 108. A third plate 110 forms the bottom of the trailing edge beam 42.

As best seen in FIGS. 2-4 and 6, the plates overlap their ends at 112 and 114 to form closures in the bottom of the flap, and forward end 116 of the plate 106 is slidably engaged with a fixed closure plate 120, attached to the spar 50. Above 112 and 114, FIGS. 2, 3, and 4, there are insignificant gaps 118 and 122, relative to the seal, at forward and rearward ends of the channel legs.

Inwardly of the legs 102 and 104 of the channel 90 is a horizontal support portion 124 secured to the bottom plate 106. Extending upwardly from the portion 124 is a vertical support member 126 and it extends upwardly adjacent the forward fixed end of the flap to the underside of the fixed portion of the top 40, secured to hold forward lower and upper plates of the flap together.

As shown in FIG. 6, the flap is raised and lowered when the camber is varied by a linkage system, generally designated as 130. The linkage system is operated by a rotary acutator 132, not shown in detail, supported on fitting 134 and spars 48, 50 and having a driving shaft 136. It extends spanwise across the flap to operate a series of spanwise spaced linkage elements 140, FIG. 1.

In FIG. 6 the linkage system is shown to have fully lowered the flap from its fully up position shown in phantom outline, and has substantially varied the camber of the flexible fiberglass top portion 40 increasing its curvature. The fiberglass is fixed to the trailing edge beam 42 so that a continuous curve is formed along the two portions. In the operation of the linkage system, the actuator 132 pivots a main beam 146 at a forward end 148, pivoted on 134, by action of beam 152 connected to rotate with the actuator. As the actuator shaft 150 rotates clockwise, the beam 152 is lowered so as to lower connecting link 154 and the beam 146. The after end of the beam 146 is pivotally connected at 156 to beam 160, connected at 162 to the trailing edge beam 42 so that the latter moves with and is supported by the beam 160. The beam 160 is pivotally connected to link 164 which in turn is pivotally connected to the flexible top portion 40, again connecting the top and bottom of the flap. The pivot 156 is also connected to the plates 106 and 108 to support them. The forward end of the beam 160 is connected to a short link 168 which is connected to a link 170 operated by the link 154.

Thus, when the link 154 is moved downwardly, the beam 146 is moved a substantial amount compared with the downward movement of the link 168, and the beam 160 and link 162 move accordingly, downwardly.

To raise the flap, the shaft 150 is rotated counterclockwise causing the links 154 and 168 to be moved upwardly. This in turn causes the pivot pin 162 to be moved upwardly so as to move the trailing end of the flap to its fully-up position. During this movement, the link 164 is also raised to rotate the flexible portion 40 directly above the link 164. Similarly, the beam 152 and link 170 are moved upwardly to raise the surface of the flexible member 40 directly.

When the flap is in the fully up position, FIG. 3, the outer legs of the channels 90 and 92 substantially cover the fingers and the gaps 72 therebetween, to form a good seal on the flap end to prevent contamination of the flap mechanism and to improve the aerodynamics of the flap. As the flap is lowered by the linkage or other means such as by hand, the flexible portion of the flap top rearwardly of the support 44 bends downwardly to increase the curvature of the camber, and gaps 72 between the fingers are closed or substantially closed, as shown in FIG. 4, to maintain a continuous seal when the channels and fingers move relative to each other to expose a greater amount of the fingers. The seal maintained by the fingers, remaining in sliding and supported engagement within the legs of the channels, during the downward movement of the flap, is determined by the contacts of the fingers as the gaps 72 are closed.

As the downward movement occurs, the bottom plate 106 of the flap slides forwardly on and is supported by the rearward end of the plate 120. Similarly, the plates slide in a supporting relationship with respect to each other at 112 and 114. When the flap is raised to the fully-up position by the linkage mechanism or by hand, for example, the movements of the parts are in reverse and the seal is maintained in the same manner as indicated above.

The aluminum legs of the channel remain in sealing support against the fingers which are coated with Teflon lubricant and can be adjusted for tightness or looseness with respect to the fingers. If the fingers wear too much, they are easily replaced by removing them from the top flexible plate 40.

In FIG. 7 a lightening embodiment of the invention is illustrated. Here, the flexible portion 40 of the top is secured to the fiberglass fingers 56 in the same manner as shown in FIG. 5. Instead of a channel, a single wall 180 of an L-shaped lower seal portion is in sliding contact with the fingers. The lower seal is made of aluminum and has a lower leg 182 which is secured to the bottom plate 106. For this embodiment an aluminum stiffener 184 is secured to extend over the lower leg 182 to aid in maintaining it in place and to hold the single aluminum leg 180 in sealing contact with the fingers. A similar single leg replaces the channel 92, illustrated in the other embodiment. The aluminum leg 180 is easily maintained in sliding adjustment against the sealing fingers 56.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

I claim:

1. In a variable camber flap, an end seal comprising:
closely spaced sealing members extending generally vertically downwardly from adjacent and being associated with the top of the flap, said sealing members being between the forward and after ends of the flap; and
lower sealing means extending generally vertically upwardly from adjacent and being associated with a bottom of the flap;
said closely spaced sealing members being slidably and sealingly engaged with said lower sealing means;
said lower sealing means being adapted to remain in sealing engagement with said closely spaced sealing members as the camber of said flap is varied by increasing the curvature as it is lowered from a normally upper position.

2. The invention according to claim 1 in which:
said lower sealing means are in supporting contact with said closely spaced sealing members.

3. The invention according to claim 1 in which:
said lower sealing means is in the form of an upwardly opening channel having two spaced legs in sealing contact with said closely spaced sealing members.

4. The invention according to claim 1 in which:
said closely spaced sealing members are secured to the flap adjacent its top;
said lower sealing means being secured to said flap along bottom forming portions.

5. The invention according to claim 4 in which:
said closely space sealing members are fingers extending from an upper plate portion, the plate portion being secured to the flap adjacent the camber to vary therewith;
said plate portion forming one leg of an inverted L in cross section and the fingers forming the other leg of the L.

6. The invention according to claim 5 in which:
the spacing between said fingers is formed by slots which extend from a lower end thereof into the plate portion and terminate in a stress relief hole therein.

7. The invention according to claim 6 in which:
said slots between said fingers tapering upwardly from the lower end;
said slots having an angle of about two degrees when the flap is in a normal upper cruise position;
said slots being substantially closed when the flap is lowered and the curvature of the camber is increased.

8. The invention according to claim 4 in which:
said bottom forming portions are articulated so that as the camber of the flap is varied the closely spaced sealing members and the lower sealing means slide in sealing engagement relative to each other.

9. A variable camber flap comprising:
a forward end of said flap adapted to be fixed to the trailing end of an airfoil;
a trailing end of said flap;
an intermediate portion of said flap extending between the forward and trailing ends;
said flap having a nominal fore to aft camber in an upper cruise position and being adapted to have an increased camber curvature in a lowered down-flap position;
an upper surface of said intermediate portion being flexible to receive the increased camber curvature in the lowered down-flap position;
lower portions of said intermediate portion being articulated to move in accordance with the camber variation;
linkage means within said flap to raise and lower said flap and to increase the curvature of the flap as it is lowered and decrease the curvature as it is raised;
an end seal on at least one span end of the flap having closely spaced sealing members extending generally vertically downwardly from adjacent and being associated with the upper surface of the intermediate portion; and
lower sealing means extending generally vertically upwardly from adjacent and being associated with said lower portions of the intermediate portion;
said closely spaced sealing members being slidably and sealingly engaged with said lower sealing means;
said lower sealing means being adapted to remain in sealing engagement with said closely spaced sealing members as the camber of said flap is varied by increasing the curvature as it is lowered and decreasing the curvature as it is raised.

10. The invention according to claim 9 in which:
said lower sealing means are in supporting contact with said closely spaced sealing members.

11. The invention according to claim 9 in which:
said lower sealing means is in the form of an upwardly opening channel having two spaced legs in sealing contact with said closely spaced sealing members.

12. The invention according to claim 9 in which:
said closely spaced sealing members are secured to the flap adjacent its top;
said lower sealing means being secured to said flap along said lower portions forming the bottom of said flap.

13. The invention according to claim 12 in which:

said closely spaced sealing members are fingers extending from an upper plate portion, the plate portion being secured to the upper surface of the intermediate portion to be varied with the camber thereof;

said plate portion forming one leg of an inverted L in cross section and the fingers forming the other leg of the L.

14. The invention according to claim 13 in which:

the spacing between said fingers is formed by slots which extend from a lower end thereof into the plate portion and terminate in a stress relief hole therein.

15. The invention according to claim 14 in which:

said slots between said fingers tapering upwardly from the lower end;

said slots having an angle of about two degrees when the flap is in a normal upper cruise position;

said slots being substantially closed when the flap is lowered and the curvature of the camber is increased.

16. The invention according to claim 12 in which:

said articulated lower portions being positioned so that as the camber of the flap is varied, the closely spaced sealing members and the lower sealing means slide in sealing engagement relative to each other.

* * * * *